United States Patent [19]

Kitahara et al.

[11] Patent Number: 5,723,417
[45] Date of Patent: Mar. 3, 1998

[54] OIL-SOLUBLE POLYESTER, ADDITIVE FOR LUBRICATING OIL, AND LUBRICATING OIL COMPOSITION

[75] Inventors: Shizuo Kitahara, Kawaguchi; Yutaka Shikatani, Kawasaki; Junichi Igarashi, Tokyo; Yoshihide Ishikawa, Himeji; Shinsuke Hasegawa, Hyogo; Michio Miyamoto, Kakogawa, all of Japan

[73] Assignees: Nippon Zeon Co., Ltd., Tokyo; Harima Chemicals, Inc., Kakogawa; Nippon Oil Company, Ltd., Tokyo, all of Japan

[21] Appl. No.: 598,604

[22] Filed: Feb. 12, 1996

[30] Foreign Application Priority Data

Feb. 10, 1995 [JP] Japan ..................... 7-045038

[51] Int. Cl.⁶ .................... C10M 145/22; C08G 63/16
[52] U.S. Cl. .................. 508/455; 508/469; 508/496
[58] Field of Search ...................... 508/469, 493, 508/492, 485, 455, 496; 560/190, 201, 204, 90

[56] References Cited

U.S. PATENT DOCUMENTS

| | | | |
|---|---|---|---|
| 2,424,588 | 7/1947 | Sparks et al. | 508/493 |
| 3,609,085 | 9/1971 | Langenfeld | 508/493 |
| 3,850,682 | 11/1974 | Sturwold et al. | 560/198 |
| 3,871,837 | 3/1975 | Bedague et al. | 508/465 |
| 3,888,908 | 6/1975 | Cross et al. | 560/90 |
| 4,130,494 | 12/1978 | Shaub et al. | 508/408 |
| 4,684,473 | 8/1987 | Bock et al. | 508/493 |
| 4,935,488 | 6/1990 | Omatsu et al. | 560/190 |
| 5,314,634 | 5/1994 | Kenbeek et al. | |
| 5,342,433 | 8/1994 | Kondo et al. | 508/440 |

OTHER PUBLICATIONS

English Abstract of JP 53102307, Sep. 6, 1978.
English Abstract of JP 52131982, Nov. 5, 1977.
English Abstract of JP 1311122, Dec. 15, 1989.
English Abstract of JP 48031186, Apr. 24, 1973.

*Primary Examiner*—Margaret Medley
*Attorney, Agent, or Firm*—Armstrong, Westerman, Hattori, McLeland & Naughton

[57] ABSTRACT

An oil-soluble polyester having a weight average molecular weight of 10,000 to 1,000,000, which is a polycondensate prepared by polycondensing the following ingredients (A) and (B): (A) a dicarboxylic acid ingredient, and (B) a diol ingredient comprising (i) a hindered glycol represented by the following formula: $HO-CH_2-CR^1R^2-CH_2-OH$ wherein $R^1$ and $R^2$ independently represent a linear or branched alkyl group, and (ii) an alkylene glycol having at least 4 carbon atoms in the main chain. This oil-soluble polyester is useful as an additive for a lubricating oil.

17 Claims, No Drawings

OIL-SOLUBLE POLYESTER, ADDITIVE FOR LUBRICATING OIL, AND LUBRICATING OIL COMPOSITION

BACKGROUND OF THE INVENTION

(1) Field of the Invention

This invention relates to an oil-soluble polyester, an additive for a lubricating oil, which comprises the oil-soluble polyester as an effective ingredient, and a lubricating oil composition comprising the oil-soluble polyester.

The oil-soluble polyester of the present invention is useful as a viscosity index improver and a thickening agent, for a mineral lubricating oil and a synthetic lubricating oil, and has an improved oxidation stability. The lubricating oil composition having incorporated therein the oil-soluble polyester is characterized as exhibiting a high viscosity index, an enhanced shear stability and a good oxidation stability. As compared with the conventional lubricating oil composition, it is especially characterized as having excellent viscosity-increasing effect and oxidation stability, and exhibiting well balanced low-temperature high-shear-rate viscosity (CCS) and high-temperature high-shear rate viscosity (TBS), which are important for an engine oil.

(2) Description of the Related Art

As a viscosity index improver and a thickening agent, there can be mentioned a polyalkyl methacrylate, polyisobutylene, an ethylene-propylene copolymer, a styrene-diene block copolymer and a hydrogenated product thereof. These polymeric materials are used usually as a linear polymer having a weight average molecular weight of at least 50,000.

Of these polymeric materials, a polyalkyl methacrylate has good viscosity index improving function and pour point-reducing function (i.e., a good low-temperature viscosity lowering function). However, where a large shearing force is imposed as used for a piston, a gear and a hydraulic pressure pump, the main chain of the polyalkyl methacrylate is broken, and the viscosity and viscosity index are undesirably reduced. Where the polyalkyl methacrylate is incorporated, some lubricating oils tend to have a precipitate during their use.

Polyisobutylene and an ethylene-propylene copolymer exhibit an enhanced shear stability, but have a poor viscosity index improving function, i.e., exhibit a mere viscosity improving function.

Polyester viscosity index improvers are described in Japanese Unexamined Patent Publication (JP-A) No. 48-31186, ibid. 52-131982 and ibid. 53-102367. More specifically, a viscosity index improver comprising a low-molecular-weight complete ester derived from a polyalkylenesuccinic acid or a polymerized fatty acid and a dihydric alcohol is described in JP-A 48-31186. This viscosity index improver has a relatively low viscosity index improving function. A viscosity index improver composed of a polyester derived from a polymerized fatty acid and a dihydric alcohol and terminated with an aliphatic alcohol or a carboxylic acid is described in JP-A 52-131982. This viscosity index improver exhibits a relatively low viscosity index improving function and has poor low-temperature viscosity characteristics. A lubricating oil composition comprising (1) a mineral oil, (2) an ester of a polyhydric alcohol having a neopentyl structure with a monocarboxylic acid, and (3) an ester prepared by polycondensing a polyhydric alcohol having a neopentyl structure with a monocarboxylic acid and simultaneously with a polycarboxylic acid is described in JP-A 53-102307.

This lubricating oil composition has good thermal stability, viscosity index and resistance to viscosity change under load, but the ester ingredients (2) and (3) prepared from a monocarboxylic acid have a low degree of polycondensation, as well known (for example, this fact is described in Encyclopedia of Polymer Science and Technology, vol. 11, "Polyester"). Therefore these ester ingredients have a poor viscosity index improving effect.

Further, a viscosity index improver composed of a polyester prepared by polycondensing a dimerized fatty acid with a glycol having no hydrogen bound to the carbon atom at the β-position and terminated with a monohydric alcohol is described in JP-A 1-311122. This viscosity index improver has a low degree of polycondensation, and thus, both the viscosity index improving effect and the viscosity increasing effect are poor.

To sum up, the conventional polyester viscosity index improvers generally have a good shear stability, but, as regards the low-temperature viscosity characteristics and viscosity index improving effect, there are increasing demands for enhancing these characteristics.

SUMMARY OF THE INVENTION

An object of the present invention is to provide an oil-soluble polyester having good shear stability, viscosity index improving effect and low-temperature viscosity characteristics.

Another object is to provide an additive for a lubricating oil, which comprises an oil-soluble polyester having the beneficial properties.

Still another object is to provide a lubricating oil composition comprising as an effective ingredient an oil-soluble polyester having the beneficial properties.

In accordance with the present invention, there is provided an oil-soluble polyester having a weight average molecular weight of 10,000 to 1,000,000, which a polycondensate prepared by polycondensing the following ingredients (A) and (B):

(A) a dicarboxylic acid ingredient, and (B) a diol ingredient comprising (i) a hindered glycol represented by the following formula:

$$HO-CH_2-CR^1R^2-CH_2-OH$$

wherein $R^1$ and $R^2$ independently represent a linear or branched alkyl group, and (ii) an alkylene glycol having at least 4 carbon atoms in the main chain.

DESCRIPTION OF THE PREFERRED EMBODIMENTS

By the term "oil-soluble polyester" used herein we mean a polyester, a solution of which exhibits a light transmittance of at least 90%, preferably at least 95%, as measured by the following method.

5 g of a polyester is placed in 95 g of a paraffinic mineral oil having a kinematic viscosity of 4.1 mm$^2$/sec at 100° C., a viscosity index of 101, an aniline point of 97.8° C. and a pour point of −15° C., and the mixture is stirred in a nitrogen atmosphere at 100° C. for one hour to dissolve the polyester. Then the resulting solution is cooled to room temperature (20° C.). The cooled solution is allowed to stand at 20° C. in a thermostatically controlled chamber for 24 hours. The solution is again stirred, and the light transmittance (%) is measured by a turbidity meter (Model "ANA-14S" supplied by TOKYO PHOTOELECTRIC CO., LTD.). A tungsten incandescent electric lamp (6V, 6A) is used as a light source, and 20 mm square glass cell is used as a cell. The light transmittance as measured in the state where the shutter is closed is regarded as zero, and the light transmittance of the paraffinic mineral oil used is regarded as 100%.

As examples of the dicarboxylic acid used in the present invention, linear, branched, cyclic and aromatic higher dicarboxylic acids having usually at least 20 carbon atoms are preferably. These dicarboxylic acids may be used either alone or in combination. Of these, those are more preferably which contain at least 60% by weight of a branched higher dicarboxylic acid. Preferably the branched dicarboxylic acid is at least one carboxylic acid selected from alkylenesuccinic acids and dimer acids of polymerized fatty acids. The most preferable branched dicarboxylic acid is a dimer acid of a polymerized fatty acid.

A polymerized fatty acid is a polymerization produce of higher fatty acids. More specifically, a polymerized fatty acid is the generic name of polymerized acids prepared by polymerizing fatty acids having usually 8 to 24, preferably 16 to 20 carbon atoms, which are saturated or have at least one unsaturation, or fatty acid ester derivatives thereof. Commercially available polymerized fatty acids are polymerization products of oleic acid, linolic acid, ricinoleic acid, eleostearic acid and other fatty acids, which contain dimer acids as the principal ingredients, and polymeric acids comprising trimer or more polymers and monomeric acids as minor ingredients. Structural analysis of polymerized fatty acids are described in D. H. Macmahon et al; J. Am. Oil. Chem. Soc., vol. 51, 522 (1974). The polymerized products can be fractionated into a plurality of polymerized fatty acids having different contents of the respective ingredients by distillation or extraction with a solvent.

Hydrogenated polymerized fatty acids having an enhanced thermal stability can be prepared by hydrogenating the unsaturated carbon-carbon bonds remaining in the polymerized fatty acids.

Unrefined polymerized fatty acids, refined polymerized fatty acids and hydrogenated polymerized fatty acids can be used in the present invention. Refined polymerized fatty acids containing at least 60% by weight, especially at least 95% by weight, of dimer acids, and hydrogenation products thereof are preferable.

A polyalkylenesuccinic acid is represented by the following formula (1):

(1)

wherein R represents a polymer chain of a lower alkylene which is at least one alkylene preferably selected from ethylene, propylene and butylene. The polymer chain preferably has a polymerization degree of 10 to 300.

If desired, dicarboxylic acids other than dimer acids of polymerized fatty acids and a polyalkylenesuccinic acid can be used in combination with the dimer acids and the polyalkylenesuccinic acid. As examples of such dicarboxylic acids, there can be mentioned succinic acid, glutaric acid, adipic acid, pimelic acid, azelaic acid, sebacic acid and phthalic acid.

The divalent alcoholic ingredient (B) used in the present invention comprises (i) a glycol having no hydrogen atom at the β-position, which is represented by the formula:

wherein $R^1$ and $R^2$ independently represent a linear or branched alkyl group, and (ii) an alkylene glycol having at least 4 carbon atoms in the main chain. In the above formula, the sum of carbon numbers in $R^1$ and $R^2$ is at least 3, preferably at least 4 and more preferably at least 5. The permissible largest number of the sum of carbon numbers in $R^1$ and $R^2$ is not particularly limited, but is preferably 20, more preferably 10. When the sum of carbon numbers in $R^1$ and $R^2$ is too small, the oxidation stability becomes low. In contrast, when the sum of carbon numbers in $R^1$ and $R^2$ is too large, the reactivity with carboxylic acid ingredients becomes poor.

As examples of the linear or branched alkyl group, there can be mentioned methyl, ethyl, n-propyl, iso-propyl, n-butyl, iso-butyl, sec-butyl, t-butyl, n-pentyl, n-hexyl, n-octyl and 2,2-dimethylhexyl. Of these, n- or t-alkyl groups having no methine proton such as ethyl, n-propyl, n-butyl, t-butyl, n-hexyl and 2,2-dimethylhexyl are preferable. Especially, n-alkyl groups such as ethyl, n-propyl, n-butyl and n-hexyl are more preferable.

The glycol of the above formula having no hydrogen at the β-position is synthesized by a method similar to the method described in JP-A 3-161452, i.e., a method comprising a combination of an aldol condensation mechanism with a Cannizzaro reaction mechanism. For example, dimethylolheptane is synthesized from n-butylaldehyde, sodium hydroxide and formaldehyde. As specific examples of the glycol, there can be mentioned 2-butyl-2-ethyl-1,3-propanediol, 2-pentyl-2-propyl-1,3-propanediol, 2-propyl-2-ethyl-1,3-propanediol, 2,2-diethyl-1,3-propanediol and 2-ethyl-2-methyl-1,3-propanediol.

As the alkylene glycol having at least 4 carbon atoms in the main chain used in combination with the hindered glycol having no hydrogen at the β-position, there can be mentioned 1,4-butanediol, 1,5-pentanediol, 1,6-hexandediol, 3-methyl-1,5-pentanediol and 1,8-octanediol.

The ratio of the hindered glycol to the alkylene glycol is usually in the range of 5/95 to 95/5 by mole, preferably 40/60 to 90/10 by mole and 60/40 to 85/15 by mole. If this ratio is too small, the oxidation stability is reduced. In contrast, this ratio is too large, the viscosity increasing effect becomes poor.

Where an oil-soluble polyester having an especially high molecular weight is desired, a small amount of at least one multi-valent ingredient selected from carboxylic acids with a valency of at least three and alcohols with a valency of at least three is used in combination with the dicarboxylic acid ingredient (A) and the diol ingredient (B) comprising the hindered glycol and the alkylene glycol.

The effect of a viscosity index improvement generally has a positive relationship with the molecular weight of polymer added. The higher the molecular weight of a polyester viscosity index improver, the higher the viscosity index. Therefore, it is essential to obtain a high polymer when a dicarboxylic acid ingredient such as a polymerized fatty acid or a polyalkylenesuccinic acid is polycondensed with a diol ingredient. The molecular weight of the polyester varies depending upon the particular OH/COOH ratio. Namely, if the OH/COOH ratio (equivalent ratio) is 1.0, the molecular weight will increase to an unlimited extent. However, when the OH/COOH ratio is 1.0, the rate of reaction is reduced with a progress of the polycondensation reaction, and thus, a substantial long period of time is required for the completion of reaction. This is not advantageous from an economical viewpoint.

In the polycondensation of the dicarboxylic acid ingredient with the diol ingredient, the molecular weight of the obtained polymer can be effectively increased by the incorporation of a small amount of an alcohol with a valency of at least three in the diol ingredient, or a small amount of a carboxylic acid with a valency of at least three in the dicarboxylic acid ingredient.

As specific examples of the carboxylic acid, there can be mentioned trimellitic acid, tricarballytic acid (1,2,3-propanetricarboxylic acid), camphoronic acid (2,3-dimethylmethane-1,2,3-tricarboxylic acid), trimesic acid (1,3,5-benzenetricarboxylic acid), trimer acids of polymerized fatty acids, and hydrogenation products thereof. Of these, trimesic acid, trimer acids of polymerized fatty acids, and hydrogenation products thereof are preferable. Trimer acids of polymerized fatty acids, and hydrogenation products thereof are most preferable.

Where a polyester having an especially high molecular weight is desired, as an especially preferable example of the combination of the dicarboxylic acid ingredient with a small amount of a carboxylic acid with a valency of at least 3, there can be mentioned a mixture of polymerized fatty acid containing at least 95% of a dimer ingredient, or its hydrogenation product, and polymerized fatty acid containing at least 15% of a trimer ingredient, or its hydrogenation product, wherein the ratio of the dimer ingredient to the trimer ingredient is in the range of 1,000/1 to 1,000/200 by mole.

As specific examples of the alcohol with a valency of at least three, there can be mentioned trimethylolethane, trimethylolpropane, trimethylolbutane, glycerol, pentaerythritol, dipentaerythritol, sorbitol, glucose, manitol, sucrose and dextrose. Of these, trimethylolethane, trimethylolpropane, glycerol, pentaerythritol, dipentaerythritol and sorbitol are preferable.

The equivalent ratio of OH in the total alcohol ingredient to COOH in the total carboxylic acid ingredient is preferably in the range of 0.8 to 1.3, more preferably 0.9 to 1.1 and most preferably approximately 1.0. The amount of the carboxylic acid with a valency of at least three is not larger than 15% by mole based on the total weight of the carboxylic acid ingredients. The amount of the alcohol with a valency of at least three is not larger than 15% by mole based on the total weight of the alcohol ingredients. The amount of the multi-valent ingredient (i.e., a carboxylic acid with a valency of at least three and/or an alcohol with a valency of at least three) is in the range of 0.1 to 15% by mole, preferably 1 to 10% by mole, based on the total of the dicarboxylic acid ingredient (A) and the diol ingredient (B). If the amount of the carboxylic acid with a valency of at least three and/or the alcohol with a valency of at least three is too large, the polycondensation reaction is difficult to control.

Provided that the object of the present invention is achieved, a monocarboxylic acid can be used in combination with the dicarboxylic acid ingredient (A) and the carboxylic acid with a valency of at least three. As examples of the monocarboxylic acid, there can be mentioned saturated fatty acids such as 2-methylpropane acid, iso-octylic acid, isononanoic acid, lauric acid, myristic acid, palmitic acid, stearic acid, isostearic acid and arachic acid, and unsaturated acids such as linolic acid, oleic acid and elaidic acid. The maximum permissible amount of the monocarboxylic acid is generally not larger than 10% by mole based on the total carboxylic acid ingredients.

The total carboxylic acid ingredients have an iodine value of preferably not larger than 50, more preferably not larger than 10. Where the iodine value is low, the oxidation stability of the resulting polyester is enhanced. In this respect, hydrogenation products of polymerized fatty acids including dimer acids, and hydrogenation products of polymerized fatty acids including trimer acids are preferable in the present invention. Hydrogenation of polymerized fatty acids can be conducted by a known method, for example, described in D. H. Macmahon et al: J. Am. Chem. Soc., vol. 51, p522 (1974).

Provided that the object of the present invention is achieved, monohydric alcohols and dihydric alcohols other than the diol ingredient comprising a glycol having no hydrogen atom at the β-position and the alkylene glycol (B) can be used in combination with the ingredient (B). As specific examples of the dihydric alcohols, there can be mentioned alkanediols such as ethylene glycol, propylene glycol, 1,2-butanediol, 1,4-butanediol, 1,6-hexanediol, 3-methyl-1,5-pentanediol, neopentyl glycol and dimer diol, polyoxyalkylene glycols such as polyethylene glycol, polypropylene glycol and polyoxyethylene-polypropylene glycol, including oligo oxyalkylene glycols such as diethylene glycol, dipropylene glycol and triethylene glycol, and polyesterdiols. As specific examples of the monohydric alcohols, there can be mentioned neopentyl alcohol, 3-methyl-3-pentanol, 3-ethyl-3-pentanol, 2,3,3-trimethyl-2-butanol, 1-decanol and nonyl alcohol.

The polycondensation of the above-mentioned ingredients (A) and (B) and other operational carboxylic acid ingredient and alcohol ingredient can be conducted by the conventional procedure. Usually the polycondensation is carried out at a temperature of 150° to 280° C. in an inert gas atmosphere. If desired, a non-aqueous organic solvent forming an azeotrope with water such as toluene or xylene is used as the reaction medium. The reaction may be carried out under a reduced pressure. In the polycondensational esterification, an esterification catalyst is used, which includes, for example, paratoluenesulfonic acid, sulfuric acid, a trifluoroboron complex, phosphoric acid, hydrochloric acid, potassium acetate, zinc stearate, zinc, titanium, and metal oxides such as tin oxide and titanium oxide. Of these, metal oxides are preferable in view of the oxidation stability.

The thus-prepared oil-soluble polyester has a weight average molecular weight (Mw) of 10,000 to 1,000,000, preferably 15,000 to 600,000 and more preferably 20,000 to 400,000. The most preferable molecular weight is 40,000 to 200,000. If the Mw is too small, the effect of viscosity index improvement is poor. In contrast, if the Mw is too large, the shear stability and solubility in a mineral oil and other lubricating oils are reduced.

The oil-soluble polyester of the present invention can be used either alone or as a mixture comprised of at least two of the polyesters or a mixture comprised of at least one of the polyester and at least one other polyester which includes, for example, an ordinary polyester made from a dicarboxylic acid and a dihydric alcohol. The molecular weight of the polyester used in combination with the polyester of the present invention can be appropriately chosen depending upon the intended use and the kind of the polyester used. For example, if a polyester having a weight average molecular weight of 10,000 to 50,000 is used in combination with a polyester having a weight average molecular weight of 50,000 to 1,000,000, the resulting polyester composition has good and balanced effect of viscosity index improvement and shear stability.

The oil-soluble polyester of the present invention has an acid value of not larger than 10 mgKOH/g, preferably not larger than 5 mgKOH/g, and more preferably not larger than 3 mgKOH/g. If the acid value is too large, a problem of corrosion arises.

The oil-soluble polyester of the present invention has a hydroxyl value of not larger than 30 mgKOH/g, and preferably not larger than 10 mgKOH/g. If the hydroxyl value is too large, the solubility in a lubricating oil becomes poor.

The oil-soluble polyester of the present invention preferably has an iodine value of not larger than 100 in view of the oxidation stability. The iodine value is more preferably not larger than 20 and most preferably not larger than 10.

Where the oil-soluble polyester of the present invention is used as additives for a lubricating oil, such as a viscosity index improver and a thickening agent, the polyester is used as it is or, to enhance the handling properties, used in the form of a solution in a diluent. The diluent used is not particularly limited, but is usually a mineral oil or a synthetic oil which is usually used as a solvent of general purpose or a lubricating oil and which has a boiling point of 70° to 700° C., preferably 120° to 650° C., and more preferably 150° to 600° C.

The mineral oil used may be a paraffinic, naphthenic or aromatic solvent fraction or lubricating oil fraction, which is prepared by refining a solvent fraction obtained by normal pressure distillation or reduced pressure distillation of crude oil. The refining is usually carried out by a combination of refining procedures such as hydrogenation refining, sulfuric acid washing and china clay treatment. As examples of the mineral oil, there can be mentioned aromatic hydrocarbons such as benzene, toluene and xylene, petroleum solvents such as petroleum benzine, rubber solvent, soybean oil solvent, ligroin, mineral spirit, cleaning solvent and stoddard solvent, and fractions of mineral oil such as gasoline fraction, kerosine fraction, gas oil fraction and lubricating oil fraction.

As examples of the synthetic oil used, there can be mentioned low-molecular-weight α-olefin oligomers obtained by polymerization of an olefin such as ethylene, propylene, butene, isobutylene, 1-octene or 1-decene, or a mixture thereof; synthetic isoparaffin or hydrogenated poly-α-olefins, prepared by hydrogenating double bonds in poly-α-olefins; hard-type alkylbenzenes prepared by alkylating benzene with a propylene oligomer, or soft-type alkylbenzenes obtained by alkylating benzene with chlorinated paraffin prepared by chlorinating normal paraffin or with a normal olefin prepared by dehydrogenating normal paraffin separated from kerosine; alkylnaphthalenes, obtained by alkylating naphthalene with an olefin or chlorinated paraffin; diesters such as ditridecyl glutarate, di-2-ethylhexyl adipate, diisodecyl adipate, ditridecyl adipate and di-2-ethylhexyl sebacate; polyesters such as trimellitate; polyol-esters such as trimethylolpropane caprilate, trimethylolpropane pelargonate, pentaerythritol 2-ethyl-hexanoate and pentaerythritol pelargonate; polyoxyalkylene glycols; dialkyl diphenyl ethers; and polyphenyl ethers.

These mineral oils and synthetic oils may be used either alone or in combination.

Where the oil-soluble polyester is used as an additive for a lubricating oil, in the form of a solution in a diluent, the amount of the diluent used is not particularly limited, but is usually in the range of 10 to 500 parts by weight per 100 parts by weight of the oil-soluble polyester.

By the incorporation of the oil-soluble polyester as it is or as a solution in a diluent, in a base oil, a lubricating oil composition exhibiting improved viscosity-temperature characteristics (i.e., viscosity index and low-temperature characteristics) and shear stability.

The base oil used is not particularly limited, and mineral oils and synthetic oils conventionally used as based oils of lubricating oils can be used.

As examples of the mineral base oil for lubricating oil, there can be mentioned those which are prepared by refining a paraffinic or naphthenic lubricating oil fraction obtained by normal pressure distillation or reduced pressure distillation of crude oil. The refining is usually carried out by a combination of refining procedures selected from bituminous substance-removal with a solvent, extraction with a solvent, hydrogenating cracking, dewaxing with a solvent, catalytic dewaxing, hydrogenating refining, washing with sulfuric acid, and china clay treatment.

As examples of the synthetic base oil for a lubricating oil used, there can be mentioned low-molecular-weight α-olefin oligomers obtained by polymerization of an olefin such as ethylene, propylene, butene, isobutylene, 1-octene or 1-decene, or a mixture there; synthetic isoparaffin or hydrogenated poly-α-olefins, prepared by hydrogenating double bonds in poly-α-olefins; hard-type alkylbenzenes prepared by alkylating benzene with a propylene oligomer, or soft-type alkylbenzenes obtained by alkylating benzene with chlorinated paraffin prepared by chlorinating normal paraffin or with a normal olefin prepared by dehydrogenating normal paraffin separated from kerosine; alkylnaphthalenes obtained by alkylating naphthalene with an olefin or chlorinated paraffin; diesters such as ditridecyl glutarate, di-2-ethylhexyl adipate, diisodecyl adipate, ditridecyl adipate and di-2-ethylhexyl sebacate; polyesters such as trimellitate; polyol-esters such as trimethylolpropane caprilate, trimethylolpropane pelargonate, pentaerythritol 2-ethylhexanoate and pentaerythritol pelargonate; polyoxalkylene glycols; dialkyl diphenyl ethers; and polyphenyl ethers.

These base oils and synthetic oils may be used either alone or in combination. The base oil may also be used as a diluent for diluting the oil-soluble polyester of the present invention when the polyester is used as an additive for a lubricating oil.

The viscosity of the base oil used is not particularly limited, but the kinematic viscosity at 100° C. is usually 1 to 100 mm²/s, preferably 2 to 50 mm²/s and more preferably 2 to 20 mm²/s.

The amount of the oil-soluble polyester incorporated in a base oil for a lubricating oil is not particularly limited, but is usually 0.1 to 40% by weight, preferably 0.3 to 30% by weight and more preferably 0.5 to 20 % by weight, based on the total weight of the lubricating oil composition.

The incorporation of the oil-soluble polyester in a base oil results in a lubricating oil composition exhibiting improved viscosity-temperature characteristics (i.e., viscosity index and low-temperature characteristics) and shear stability, as mentioned above. When a polymethacrylate is further added in the lubricating oil composition, the viscosity-temperature characteristics (i.e., viscosity index and low-temperature characteristics) are further enhanced and the oxidation stability is improved, while the improved shear stability is maintained.

As the polymethacrylate, a non-dispersant-type polymethacrylate, a dispersant-type polymethacrylate and a mixture thereof are used.

As typical examples of the non-dispersant-type polymethacrylate, there can be mentioned polymers of an alkyl methacrylate represented by the following formula (2):

wherein $R^3$ represents an alkyl group having 1 to 24 carbon atoms, preferably 1 to 18 carbon atoms. As specific examples of the alkyl group, there can be mentioned methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl and tetracosyl groups. These alkyl groups may be either linear or branched.

The polymethacrylate may be a homopolymer of an alkyl methacrylate of the formula (2) or a copolymer (random copolymer, block copolymer or alternating copolymer) of two or more of alkyl methacrylates of the formula (2). In view of excellent viscosity-temperature characteristics, a copolymer, especially a random copolymer is preferable. The non-dispersant-type polymethacrylate may be used either alone or in combination.

As examples of the dispersant-type polymethacrylate, there can be mentioned copolymers of a nitrogen-free ethylenically unsaturated compound with a nitrogen-containing methacrylate of the formula (3) shown below. The nitrogen-free ethylenically unsaturated compound is at least one compound selected from alkyl methacrylates of the formula (2) and aliphatic olefin compounds having 2 to 18 carbon atoms, preferably 2 to 10 carbon atoms.

As specific examples of the aliphatic olefin compound having 2 to 18 carbon atoms, there can be mentioned ethylene, propylene, butene, pentene, hexene, heptene, octene, nonene, decene, undecene, dodecene, tridecene, tetradecene, pentadecene, hexadecene, heptadecene and octadecene. These aliphatic olefin compounds may be linear or branched, and may be an α-olefin or an internal olefin. An α-olefin is preferable, and a linear α-olefin is more preferable.

The nitrogen-containing methacrylate is represented by the following formula (3):

$$CH_2=C(CH_2)—COO—(R^4)_aX \qquad (3)$$

wherein $R^4$ is an alkylene group having 1 to 18 carbon atoms, preferably 1 to 6 carbon atoms, a is an integer of 0 or 1, and X is an amine residue or a heterocyclic residue, which has 1 or 2 nitrogen atoms and 0 to 2 oxygen atoms.

As specific examples of $R^4$, there can be mentioned ethylene, propylene, butylene, pentylene, hexylene, heptylene, octylene, nonylene, decylene, undecylene, dodecylene, tridecylene, tetradecylene, pentadecylene, hexadecylene, heptadecylene and octadecylene. These alkylene groups may be either linear or branched.

As specific examples of X in the formula (3), there can be mentioned the following groups: dimethylamino, diethylamino, dipropylamino, dibutylamino, anilino

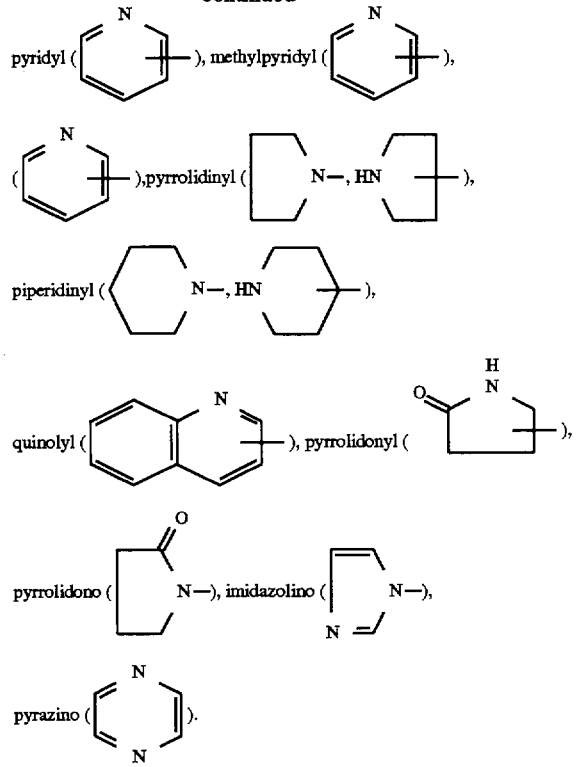

As preferable examples of the nitrogen-containing methacrylate, there can be mentioned the following compounds and mixtures thereof:

dimethylaminomethyl methacrylate $[CH_2=C(CH_3)COOCH_2—N(CH_3)_2]$,
diethylaminomethyl methacrylate $[CH_2=C(CH_3)COOCH_2—N(C_2H_5)_2]$,
dimethylaminoethyl methacrylate $[CH_2=C(CH_3)COO—CH_2CH_2—N(CH_3)_2]$,
diethylaminoethyl methacrylate $[CH_2=C(CH_3)COO—CH_2CH_2—N(C_2H_5)_2]$,
morpholinomethyl methacrylate

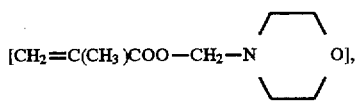

and
morpholinoethyl methacrylate

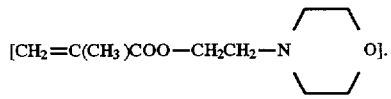

The dispersant-type polymethacrylate used is a copolymer of the nitrogen-free monoethylenically unsaturated monomer with the nitrogen-containing methacrylate. The ratio of the nitrogen-free monoethylenically unsaturated monomer to the nitrogen-containing methacrylate is not particularly limited, but is usually in the range of 70/30 to 99/1 by mole, preferably 80/20 to 98/2 by mole. The copolymerization process also not particularly limited, and a process is usually employed wherein the monomeric ingredients are copolymerized by a radical solution polymerization procedure using a polymerization initiator such as benzoyl peroxide. The copolymer may be a random copolymer, a block copolymer or an alternating copolymer. In view of excellent viscosity-temperature characteristics, a random copolymer is especially preferable.

Where the non-dispersant-type polymethacrylate or the dispersant-type polymethacrylate is incorporated together with the oil-soluble polyester in the lubricating oil composition of the present invention, the non-dispersant-type polymethacrylate and the dispersant-type polymethacrylate may be used alone, or as a mixture comprising the non-dispersant-type polymethacrylate and the dispersant-type polymethacrylate at an optional ratio.

The weight average molecular weights of the non-dispersant-type polymethacrylate and the dispersant-type polymethacrylate are not particularly limited, and is usually in the range of 10,000 to 300,000, preferably 20,000 to 200,000.

Where both the oil-soluble polyester and the polymethacrylate are incorporated in the lubricating oil composition of the present invention, the total amount of the oil-soluble polyester and the polymethacrylate are usually in the range of 0.1 to 40% by weight, preferably 0.3 to 30% by weight and more preferably 0.5 to 20% by weight, based on the total weight of the lubricating oil composition. The ratio of the oil-soluble polyester to the polymethacrylate is not particularly limited, and is usually in the range of 5/95 to 95/5 by weight, preferably 20/80 to 80/20 by weight.

One or more conventional additives can be added into the lubricating oil composition of the present invention to modify the lubricating oil composition As examples of the additives used, there can be mentioned antioxidants including hindered phenolic antioxidants such as 2,6-di-t-butyl-p-cresol and 4,4'-methylenebis-2,6-di-t-butylphenol, amine antioxidants such as alkyldiphenylamine and α-naphthylamine, sulfur-containing antioxidants, zinc dithiophosphate antioxidants, zinc dithiocarbamate antioxidants and phenothiazine antioxidants; rust preventives such as an alkenylsuccinic acid, an alkenylsuccinic acid ester, a polyhydric alcohol ester, an alkaline earth metal petroleum sulfonate, an alkaline earth metal alkylbenzenesulfonate and an alkaline earth metal dinonylnaphthalenesulfonate; metal-deactivating agents such as benzotriazole and thiadizaole; abrasion preventives including high-pressure abrasion preventives, such as a phosphate ester, a phosphite ester, sulfurized fatty oil, a sulfide, a sulfophosphorized polybutene, a sulfophosphorized ester and zinc thiophosphate; lubricants such as fatty acid, an aliphatic amine, an aliphatic amine salt, a fatty acid amide, molybdenum dithiophosphate and molybdenum dithiocarbamate; metal-containing cleaning agents such as an alkaline earth metal sulfonate, an alkaline earth metal phenate, an alkaline earth metal salicylate and an alkaline earth metal phosphonate; ash-free dispersants such as an alkenylsuccinic acid imide, an alkenylsuccinic acid ester, benzylamine, polybutenylamine and an amidation product thereof; viscosity index improvers and pour-point depressants, such as polyisobutylene, an ethylene-propylene copolymer, a hydrogenated styrene-butadiene copolymer, a hydrogenated styrene-isoprene copolymer, styrenic polyesters, an ethylene-vinyl acetate copolymer and an esterified styrene-maleic anhydride copolymer; and anti-foaming agents such as methylsilicone, fluorosilicone and a polyacrylate.

The amount of these additives is not particularly limited, but is usually 0.005 to 1% by weight in the case of an antifoaming agent, 1 to 30% by weight in the case of a viscosity index improver, 0.005 to 1% by weight in the case of a metal-deactivating agent and 0.1 to 15% by weight in the case of the other additives, based on the total weight of the lubricating oil composition.

The lubricating oil composition of the present invention containing the oil-soluble polyester and an optional polymethacrylate is advantageously used as lubricating oils, to which a high viscosity index is required, and which include, for example, internal combustion engine oils such as gasoline engine oil, diesel engine oil and gas engine oil; automobile gear oils such as automatic transmission fluid, manual transmission fluid and differential oil; automobile hydraulic fluids such as shock-absorber oil and active suspension fluid. Further, the lubricating oil composition is used as two-cycle engine oil, marine oil, turbine oil, industrial gear oil, compressor oil, refrigerator oil, cutting oil, metal working oils such as rolling oil, pressing oil, forging oil, milling oil, drawing oil and punching oil, metal-processing oils such as heat-treating oil and electrical discharge machining oil, slideing guide way lubricant, bearing oil, rust preventive oil and heat transfer oil.

The invention will now be specifically described by the following examples that by no means limit the scope of the present invention.

In the examples, % and parts are by weight unless otherwise specified.

The hydroxyl value, acid value and iodine value of polyeters were determined according to the following standards described in "Standard Methods for the Analysis of Oils, fats and Derivatives" (Japan Oil Chemists' Society).

| | |
|---|---|
| Hydroxyl value | 2. 4. 9. 2–83 |
| Acid value | 2. 4. 1–83 |
| Iodine value | 2. 4. 5–71 |

EXAMPLE 1

A 1,000 ml four-necked flask equipped with a stirrer, a thermometer, a reflux condenser, a water-separating tube and a nitrogen gas supplying tube was charged with 503.3 g of hydrogenated polymerized fatty acid (hydrogenated product of "HARIDIMER 300" supplied by Harima Chemicals, Inc.) having an iodine value of 6 and an acid value of 195 mgKOH/g and containing 0.5% of monomer acid, 97.0% of dimer acid and 2.5% of trimer acid, 41.3 g of 1,6-hexanediol, 86.9 g of 2-butyl-2-ethyl-1,3-propanediol and 0.26 g of monobutyltin oxide (catalyst) (OH/COOH equivalent ratio=1.02).

Nitrogen gas was blown into the flask while the content was stirred, and the temperature was elevated to 100° C. While water produced during the reaction was removed, the temperature of the reaction mixture was elevated from 100° C. to 260° C. over a period of 6 hours. Then the reaction was continued for 10 hours at 260° C. while dehydration was conducted. The thus-obtained polyester (hereinafter abbreviated to "polyester 1") had a weight average molecular weight of 54,000, an acid value of 0.3 mgKOH/g and a hydroxyl value of 3.1 mgKOH/g. Light transmission of its solution in paraffinic mineral oil was 98%.

EXAMPLE 2

A 1,000 ml four-necked flask equipped with a stirrer, a thermometer, a reflux condenser, a water-separating tube and a nitrogen gas supplying tube was charged with 409.5 g of hydrogenated polymerized fatty acid (the same as that used in Example 1), 103.4 g of hydrogenated polymerized fatty acid (hydrogenated product of "HARIDIMER 270S" supplied by Harima Chemicals, Inc.) having an iodine value of 7.5 and an acid value of 193 mgKOH/g and containing 0.5% of monomer acid, 80.5% of dimer acid and 19.0% of trimer acid, 36.7 g of 3-methyl-1,5-pentanediol, 82.3 g of 2,2-diethyl-1,3-propanediol, and 0.26 g of monobutyltin oxide (catalyst) (OH/COOH equivalent ratio=1.05).

Nitrogen gas was blown into the flask while the content was stirred, and the temperature was elevated to 100° C. While water produced during the reaction was removed, the temperature of the reaction mixture was elevated from 100° C. to 260° C. over a period of 6 hours. Then the reaction was continued for 10 hours at 260° C. while dehydration was conducted. The thus-obtained polyester (hereinafter abbreviated to "polyester 2") had a weight average molecular weight of 88,000, and acid value of 0.3 mgKOH/g and a hydroxyl value of 2.9 mgKOH/g. Light transmission of its solution in paraffinic mineral oil was 98%.

EXAMPLE 3

A 1,000 ml four-necked flask equipped with a stirrer, a thermometer, a reflux condenser, a water-separating tube and a nitrogen gas supplying tube was charged with 498.7 g of hydrogenated polymerized fatty acid (the same as that used in Example 1), 25.6 g of 1,6-hexanediol, 101.7 g of 2-butyl-2-ethyl-1,3-propanediol, 5.2 g of trimethylolpropane and 0.26 g of monobutyltin oxide (catalyst) (OH/COOH equivalent ratio=1.05).

Nitrogen gas was blown into the flask while the content was stirred, and the temperature was elevated to 100° C. While water produced during the reaction was removed, the temperature of the reaction mixture was elevated from 100° C. to 240° C. over a period of 6 hours. Then the reaction was continued for 10 hours at 240° C. while dehydration was conducted. The thus-obtained polyester (hereinafter abbreviated to "polyester 3") had a weight average molecular weight of 96,000, an acid value of 0.2 mgKOH/g and a hydroxyl value of 3.4 mgKOH/g. Light transmission of its solution in paraffinic mineral oil was 97%.

Comparative Example 1

A 1,000 ml four-neck flask equipped with a stirrer, a thermometer, a reflux condenser, a water-separating tube and a nitrogen gas supplying tube was charged with 490.8 g of hydrogenated polymerized fatty acid (the same as that used in Example 1), 135.3 g of 2-butyl-2-ethyl-1,3-propanediol, 4.6 g of trimethylolpropane and 0.26 g of monobutyltin oxide (catalyst) (OH/COOH equivalent ratio= 1.05).

Nitrogen gas was blown into the flask while the content was stirred, and the temperature was elevated to 100° C. While water produced during the reaction was removed, the temperature of the reaction mixture was elevated from 100° C. to 240° C. over a period of 6 hours. Then the reaction was continued for 10 hours at 240° C. while dehydration was conducted. The thus-obtained polyester (hereinafter abbreviated to "polyester A") had a weight average molecular weight of 82,000, an acid value of 0.2 mgKOH/g and a hydroxyl value of 3.7 mgKOH/g.

Comparative Example 2

A 1,000 ml four-necked flask equipped with a stirrer, a thermometer, a reflux condenser, a water-separating tube and a nitrogen gas supplying tube was charged with 510.1 g of hydrogenated polymerized fatty acid (the same as that used in Example 1), 115.8 g of dipropylene glycol, 6.0 g of trimethylolpropane and 0.26 g of monobutyltin oxide (catalyst) (OH/COOH equivalent ratio=1.05).

Nitrogen gas was blown into the flask while the content was stirred, and the temperature was elevated to 100° C. While water produced during the reaction was removed, the temperature of the reaction mixture was elevated from 100° C. to 240° C. over a period of 6 hours. Then the reaction was continued for 10 hours at 240° C. while dehydration was conducted. The thus-obtained polyester (hereinafter abbreviated to "polyester B") had a weight average molecular weight of 93,000, an acid value of 0.4 mgKOH/g and a hydroxyl value of 4.2 mgKOH/g.

EXAMPLE 4

A 1,000 ml four-necked flask equipped with a stirrer, a thermometer, a reflux condenser, a water-separating tube and a nitrogen gas supplying tube was charged with 503.3 g of hydrogenated polymerized fatty acid (the same as that used in Example 1), 41.3 g of 1,6-hexanediol, 71.7 g of 2,2-diethyl-1,3-propanediol and 0.26 g of monobutyltin oxide (catalyst) (OH/COOH equivalent ratio=1.02).

Nitrogen gas was blown into the flask while the content was stirred, and the temperature was elevated to 100° C. While water produced during the reaction was removed, the temperature of the reaction mixture was elevated from 100° C. to 260° C. over a period of 6 hours. Then the reaction was continued for 10 hours at 260° C. while dehydration was conducted. The thus-obtained polyester (hereinafter abbreviated to "polyester 4") had a weight average molecular weight of 56,000, an acid value of 0.3 mgKOH/g and a hydroxyl value of 3.3 mgKOH/g. Light transmission of its solution in paraffinic mineral oil was 98%.

EXAMPLE 5

Using polyesters 1 to 4 and A and B, prepared in Examples 1 to 4 and Comparative Examples 1 and 2, additives for a lubricating oil (i.e., viscosity index improvers) I to VI were prepared. Namely, 50 parts of each polyester was blended with 50 parts of a diluent oil ("Neutral 100" refined paraffinic mineral oil having a kinematic viscosity of 4.1 mm²/s at 100° C., a viscosity index of 101, an aniline point of 97.8° C. and a pour point of −15° C.).

Each of the additives I to VI was added to the above-mentioned refined paraffinic mineral oil to prepare a lubricating oil composition. In run 5 and run 6, a polymethacrylate was added in combination with the additive. The amount of each additive was adjusted so that the resulting lubricating oil composition had a kinematic viscosity of about 10 cSt (10 mm²/s) at 100° C.

The viscosity index (VI) of the lubricating oil composition was measured according to JIS K-2283. The shear stability of the lubricating oil composition was expressed by viscosity reduction (%) which was determined by measuring kinematic viscosity (mm²/s) before and after irradiation with ultrasonic wave and calculating the viscosity reduction by the following formula according to JPS-5S-29-88.

Viscosity reduction (%)=[($V_O$−$V_f$)/$V_O$]×100 wherein $V_O$ is kinematic viscosity (mm²/s) as measured before ultrasonic irradiation, and $V_f$ is kinematic viscosity (mm²/s) as measured after ultrasonic irradiation. The results are shown in Table 1.

5,723,417

TABLE 1

| Run No. | Examples of Invention | | | | | | Comparative Examples | |
|---|---|---|---|---|---|---|---|---|
| | 1 | 2 | 3 | 4 | 5 | 6 | 1 | 2 |
| Polyester | 1 | 2 | 3 | 4 | 1 | 3 | A | B |
| VI improver | I | II | III | IV | I  PMA*1 | III  PMA*2 | V | VI |
| Amount added | 10.8 | 9.2 | 8.7 | 10.2 | 5.3  5.3 | 4.3  43. | 11.0 | 10.7 |
| Viscosity index (VI) | 198 | 210 | 214 | 200 | 238 | 245 | 202 | 208 |
| Shear stability | | | | | | | | |
| Viscosity reduction (40° C.) (%) | 1.5 | 5.1 | 5.8 | 1.6 | 1.7 | 5.1 | 6.2 | 6.3 |
| Viscosity reduction (100° C.) (%) | 1.7 | 5.0 | 5.7 | 1.7 | 1.9 | 5.1 | 6.3 | 6.5 |

*1 Non-dispersant-type polymethacryalte (random copolymer of mixture of alkyl methacrylates having 1 to 18 carbon atoms in the alkyl group, weight average molecular weight = 83,000)
*2 Dispersant-type polymethacrylate (random copolymer of mixture of alkyl methacrylates having 1 to 18 carbon atoms in the alkyl group) with diethylaminoethyl methacrylate, weight average molecular weight =0 100,000, content of nitrgen-containing monomer = 5 mole %)

EXAMPLE 6

Each of the additives I to VI used in Example 5 was added into the above-mentioned refined paraffinic mineral oil to prepare a lubricating oil composition having a kinematic viscosity of about 10 cSt (10 mm²/s). The viscosity as measured by a cold cranking simulator (CCS) at −25° C., and the high-temperature high-shear-rate viscosity as measured at 150° C. and under a shear rate of $1 \times 10^6$/sec by a tapered bearing simulator (TBS) were determined according to ASTM-D4683. The results are shown in Table 2.

TABLE 2

| Run No. | Examples of Invention | | | | | | Comparative Examples | |
|---|---|---|---|---|---|---|---|---|
| | 1 | 2 | 3 | 4 | 5 | 6 | 1 | 2 |
| CCS −25° C. cP (×10⁻³ Pas) | 1050 | 1210 | 1260 | 1070 | 980 | 1070 | 1460 | 1340 |
| TBS 150° C. cP (×10⁻³ Pas) | 3.08 | 3.25 | 3.18 | 3.10 | 3.12 | 3.23 | 3.15 | 3.03 |

As seen from Tables 1 and 2, the oil-soluble polyester of the present invention is an additive for a lubricating oil, exhibiting good viscosity index improving effect. Where a polymethacrylate is used in combination with the oil-soluble polyester, the oxidation stability and viscosity index improvement are enhanced.

What is claimed is:

1. An oil-soluble polyester having a weight average molecular weight of 10,000 to 1,000,000, which is a polycondensate prepared by polycondensing the following ingredients (A) and (B):

(A) a dicarboxylic acid, and (B) a diol comprising (i) a hindered glycol represented by the following formula:

HO—CH₂—CR¹R²—CH₂—OH wherein $R^1$ and $R^2$ independently represent a linear or branched alkyl group, the sum of $R^1$ and $R^2$ being at least 3 and (ii) an alkylene glycol having at least 4 carbon atoms in the main chain, the ratio of the hindered glycol (i) to the alkylene glycol (ii) being in the range of 5/95 to 95/5 by mole.

2. The oil-soluble polyester according to claim 1, wherein the dicarboxylic acid (A) is a dicarboxylic acid having at least 20 carbon atoms.

3. The oil-soluble polyester according to claim 1, wherein the dicarboxylic acid (A) is a refined polymerized fatty acid comprising at least 60% by weight, based on the weight of the polymerized fatty acid, of a dimer acid, or a hydrogenated product of the polymerized fatty acid.

4. The oil-soluble polyester according to claim 1, wherein not more than 20% by mole, based on the total of the dicarboxylic acid (A) and the diol (B), of a multi-valent selected from the group consisting of a carboxylic acid with a valency of at least three and an alcohol with a valency of at least three is used in combination with the dicarboxylic acid (A) and the diol ingredient (B).

5. The oil-soluble polyester according to claim 1, wherein the equivalent ratio of OH in the total alcohol to COOH in the total carboxylic acid is in the range of 0.8 to 1.3

6. The oil-soluble polyester according to claim 1, wherein the total carboxylic acid has an iodine value not larger than 50.

7. The oil-soluble polyester according to claim 1, which has an acid value not larger than 10 mgKOH/g.

8. The oil-soluble polyester according to claim 1, which has a hydroxyl value not larger than 30 mgKOH/g.

9. The oil-soluble polyester according to claim 1, which has an iodine value not larger than 100.

10. A lubricant oil additive which consists essentially of the oil soluble polyester of claim 1.

11. A lubricant oil additive concentrate comprising the oil-soluble polyester of claim 1 in the form of a solution in a diluent oil.

12. A lubricating oil composition comprising the oil soluble polyester as claimed in claim 1, and a base oil which is a synthetic oil or a mineral oil which has a kinematic viscosity of 1 to 100 mm²/sec at 100° C.

13. The lubricating oil composition according to claim 12, wherein the content of the oil-soluble polyester is in the range of 0.1 to 40% by weight based on the weight of the lubricating oil composition.

14. The lubricating oil composition according to claim 12, which further comprises a polymethacrylate.

15. The lubricating oil composition according to claim 14, wherein the polymethacrylate has a weight average molecular weight of 10,000 to 300,000.

16. The lubricating oil composition according to claim 14, wherein the content of the sum of the oil-soluble polyester and the polymethacrylate is in the range of 0.1 to 40% by weight based on the weight of the lubricating oil composition.

17. The lubricating oil composition according to claim 14, wherein the ratio of the oil-soluble polyester to the polymethacrylate is in the range of 5/95 to 95/5 by weight.

* * * * *